United States Patent [19]

MacLachlan

[11] 4,271,275

[45] Jun. 2, 1981

[54] FLUOROELASTOMER COMPOSITION CONTAINING OXIRANE ACID ACCEPTOR

[75] Inventor: James D. MacLachlan, Kennett Square, Pa.

[73] Assignee: E. I. Du Pont de Nemours and Company, Wilmington, Del.

[21] Appl. No.: 103,957

[22] Filed: Dec. 14, 1979

[51] Int. Cl.$^3$ .............................................. C08L 63/00
[52] U.S. Cl. ................................ 525/112; 260/42.28; 525/121; 525/385
[58] Field of Search ....................... 525/112, 121, 385

[56] References Cited

U.S. PATENT DOCUMENTS

| | | | |
|---|---|---|---|
| 2,904,528 | 9/1959 | Honn | 525/121 |
| 3,147,314 | 9/1964 | Cluff | 525/385 |
| 3,524,836 | 8/1970 | Barney | 525/385 |
| 3,876,654 | 4/1975 | Pattison | 525/385 |
| 4,035,565 | 7/1977 | Apotheker | 526/249 |
| 4,098,756 | 7/1978 | Miller | 525/121 |
| 4,115,481 | 9/1978 | Finlay | 260/900 |

FOREIGN PATENT DOCUMENTS 1313701 12/1969 United Kingdom .

*Primary Examiner*—Paul Lieberman

[57] ABSTRACT

Novel curable fluoropolymer compositions containing fluoroelastomer, peroxide, co-agent, conventional additives, e.g., pigments and fillers, and also containing oxirane as the acid acceptor.

5 Claims, No Drawings

FLUOROELASTOMER COMPOSITION CONTAINING OXIRANE ACID ACCEPTOR

DESCRIPTION

1. Technical Field

This invention relates to peroxide curable fluoroelastomer compositions wherein the fluoroelastomer is derived from a small quantity of bromine-containing monomer and a large quantity of other monomers including tetrafluoroethylene, perfluoroalkyl perfluorovinyl ethers, olefinic hyrocarbons, vinylidene fluoride, and fluorine containing olefins, which compositions generally contain, in addition to the fluoroelastomer, an organic peroxide curing agent, a polyunsaturated coagent, conventional additives, e.g., pigments and fillers, and a divalent metal oxide or hydroxide acid acceptor. More specifically, this invention relates to the improvement of such peroxide curable fluoroelastomer compositions by substitution of an oxirane for said divalent oxide or hydroxide acid acceptors, thereby significantly improving the resistance to environmental attack of the vulcanizates of such compositions. Vulcanizates of such fluoroelastomer compositions containing metal oxide or metal hydroxide acid acceptors are generally known to possess excellent physical properties and resistance to environmental attack and accordingly, find use in such articles as films, gaskets, o-rings, coated fabrics, wire insulation, hoses and protective coatings. The present invention relates to similar fluoroelastomer compositions which have achieved significantly improved resistance to certain types of environmental attack without sacrificing physical properties and resistance to other types of environmental attack.

2. Background Art

U.S. Pat. No. 4,035,565, granted July 12, 1977, to Apotheker et al discloses certain peroxide curable fluoropolymer compositions wherein the fluoropolymer is derived from a small quantity of bromine-containing monomer and a large quantity of other monomers including tetrafluoroethylene, perfluoroalkyl perfluorovinyl ethers, olefinic hydrocarbons, vinylidene fluoride, and fluorine containing olefins, which compositions generally contain, in addition to the fluoroelastomer, an organic peroxide curing agent, a polyunsaturated coagent, conventional additives, e.g., pigments and fillers, and a divalent metal oxide or hydroxide acid acceptor. More specifically, Apotheker et al discloses, among other things, certain peroxide curable fluoropolymer compositions wherein the fluoropolymer is a copolymer whose interpolymerized units consist essentially of a. up to 3 mole %, based on the total moles of components (a) and (b), of units derived from a compound selected from the group: bromotrifluoroethylene and 4-bromo-3,3,4,4-tetrafluorobutene-1, with the proviso that enough of such units are present to provide at least 0.05 weight % bromine in the copolymer, and b. enough units derived from component (b-1), (b-2) or (b-3) as follows to make up the remainder of the copolymer:

b-1. tetrafluoroethylene and a perfluoroalkyl perfluorovinyl ether wherein the alkyl group contains 1–5 carbon atoms, b-2. about 45–65 mole % of tetrafluoroethylene, about 20–55 mole % of a $C_2$–$C_4$ olefinic hydrocarbon and from 0 to about 30 mole % vinylidene fluoride, or b-3. vinylidene fluoride, at least one fluorine-containing olefin copolymerizable therewith, and optionally said perfluoroalkyl perfluorovinyl ether, said olefin being a compound which contains 2–7 carbon atoms, contains no bromine atom, and contains at least as many fluorine atoms as carbon atoms.

Such fluoropolymer compositions are among those that can be improved by substitution of oxirane for metal oxide or hydroxide, thus giving the compositions of the present invention.

U.S. Pat. No. 4,115,481, granted Sept. 19, 1978, to Finlay et al discloses certain peroxide curable fluoroelastomer blends comprising:

(a) 5–90 weight percent of a non-crosslinked fluoroelastomer comprising a copolymer of vinylidene fluoride and at least one other fluoroolefin, and (b) 10–95 weight percent of a partially crosslinked fluoroelastomer comprising a copolymer of vinylidene fluoride, at least one other fluoroolefin, and about 0.5–3.0 weight percent of bromotrifluoroethylene.

Finlay et al further discloses peroxide curable fluoroelastomer compositions containing such fluoroelastomer blends and various additives including cross-linking agents, unsaturated coagents, accelerators, stabilizers, pigments, pore-forming agents, plasticizers and a metal oxide or hydroxide. Such fluoroelastomer compositions are among those that can be improved by substitution of oxirane for metal oxide or hydroxide, thus giving the compositions of the present invention.

3. Disclosure of the Invention

The present invention relates to peroxide curable fluoroelastomer compositions having improved resistance to certain types of environmental attack, which compositions contain fluoroelastomer derived from a small quantity of bromine-containing monomer and a large quantity of other monomers, organic peroxide curing agent, polyunsaturated curing agent, conventional additives, e.g., pigments and fillers, and at least one oxirane, i.e., an organic compound containing at least one terminal oxirane group. Such compounds include compounds commonly referred to as glycidyl resins since they will contain at least one glycidyl group of the formula:

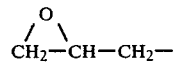

Suitable oxiranes include epoxy resins derived from epichlorohydrin and aromatic polyhydroxy compounds that have:

(1) a large enough molecular weight so that they will be substantially non-volatile at the curing temperature for the particular fluoroelastomer composition, and (2) a small enough molecular weight so that in order to achieve an appropriate member of oxirane groups, there is not so much bulk that the polymer will, in effect, be significantly diluted, thus adversely affecting the physical properties of the vulcanizates. Preferred oxiranes include glycidyl resins having a molecular weight of about 400–10,000.

Conveniently, one can use any of the many commercially available oxiranes, for example (1) Epon 828, which is the condensation product of bisphenol A and epichlorohydrin, sold by Shell Chemical Company of Houston, Tex., (2) DEN 438, which is the condensation product of novolak resin and epichlorohydrin, sold by Dow Chemical Company of Midland, Michigan, (3) ERE 1359, which is the condensation product of resorcinol and epichlorohydrin, sold by Ciba-Geigy Corporation of Ardsley, N.Y., or any of the various other oxiranes disclosed in British Pat. No. 1,313,701, published Apr. 18, 1973, in the name of Daikin Kogyo Co., Ltd.

The quantity of oxirane present in the compositions of the present invention will depend upon the particular fluoropolymer and the particular oxirane in the composition, as well as the service conditions of the finished product. For example, if one chooses an oxirane having a high molecular weight per terminal oxirane group, one will use more oxirane than if there had been chosen a low molecular weight oxirane. Generally, ½–10 weight percent of oxirane will be used, preferably 1–5 weight percent, most preferably about 5 weight percent. It should be understood that maximum benefit from the present invention can be achieved when all of the metal oxide generally found in prior art compositions, such as those of Apotheker et al and Finlay et al, is replaced by an appropriate quantity of oxirane; however, lesser benefits can also be achieved by replacing only part of the metal oxide with oxirane.

The fluoroelastomer can be a copolymer whose interpolymerized units consist essentially of a. up to 3 mole %, based on the total moles of components (a) and (b), of units derived from a compound selected from the group: bromotrifluoroethylene and 4-bromo-3,3,4,4-tetrafluorobutene-1, with the proviso that enough of such units are present to provide at least 0.05 weight % bromine in the copolymer, and b. enough units derived from component (b-1), (b-2) or (b-3) as follows to make up the remainder of the copolymer:

b-1. tetrafluoroethylene and a perfluoroalkyl perfluorovinyl ether wherein the alkyl group contains 1–5 carbon atoms, b-2. about 45–65 mole % of tetrafluoroethylene, about 20–55 mole % of a $C_2$–$C_4$ olefinic hydrocarbon and from 0 to about 30 mole % vinylidene fluoride, or b-3. vinylidene fluoride, at least one fluorine-containing olefin copolymerizable therewith, and optionally said perfluoroalkyl perfluorovinyl ether, said olefin being a compound which contains 2–7 carbon atoms, contains no bromine atom, and contains at least as many fluorine atoms as carbon atoms.

or it can be a blend of 10–95 weight percent of such fluoroelastomers with 5–90 weight percent of a non-crosslinked fluoroelastomer comprising a copolymer of vinylidene fluoride and at least one other fluoroolefin.

Examples of various fluoroelastomers which can be used in the compositions of the present invention and preferences for particular fluoroelastomers are discussed in detail in said U.S. Pat. No. 4,035,565 (granted July 12, 1977 to Apotheker et al) at column 2, line 5, to column 3, line 4, at column 4, line 7, to column 5, line 30, and the Examples; and in said U.S. Patent No. 4,115,481 (granted Sept. 19, 1978 to Finlay et al) at column 1, line 41 to column 3, line 24, and in the Examples, which subject matter is hereby incorporated by reference into the present application. Such fluoroelastomers can be prepared by methods described in said Apotheker et al and Finlay et al patents and in references cited therein. Most preferred fluoroelastomers include those whose interpolymerized units consist essentially of bromotrifluoroethylene, tetrafluoroethylene, vinylidene fluoride and hexafluoropropylene.

The composition of the present invention will also contain an organic peroxide curing agent, preferably an organic peroxide is selected which will function as a curing agent for the composition in the presence of the other ingredients which are to be present in the end-use composition and under the temperatures to be used in the curing operation without causing any harmful amount of curing during mixing or other operations which are to precede the curing operation. A dialkyl peroxide which decomposes at a temperature above 49° C. is especially preferred when the composition is to be subjected to processing at elevated temperatures before curing. In many cases it is preferred to use a di-t-butyl peroxide having a tertiary carbon atom attached to a peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. The organic peroxide curing agent can also be selected from such compounds as dicumyl peroxide, dibenzoyl peroxide, tertiary butyl perbenzoate, di[1,3-dimethyl-3-(t-butylperoxy)]butyl2carbonate and the like.

To illustrate an application where an organic peroxide curing agent which decomposes at or below 49° C. can be used, the composition is prepared at room temperature as a liquid film-forming composition containing an organic solvent and/or diluent by applying a layer of the liquid composition to a substrate and allowing the layer to become dried and cured at or below 49° C.

It is usually preferred that the organic peroxide content is about 1.5–5% based on the weight of the fluoroelastomer.

A material which is usually blended with the composition before it is made into end products is a coagent composed of a polyunsaturated compound which is capable of cooperating with said peroxide to provide a useful cure. This material is added in an amount equal to about 0.5–10%, preferably about 1–7%, by weight of the copolymer content. It is preferred in many applications to use as a coagent one or more of the following compounds: triallyl cyanurate; triallyl isocyanurate; tris(diallylamine)-s-triazine; triallyl phosphite; N,N-diallyl acrylamide; hexaallyl phosphoramide; N,N,N',N'-tetra-allyl terephthalamide; N,N,N'N'-tetra-allyl malonamide; trivinyl isocyanurate; 2,4,6-trivinyl methyltrisiloxane; tri(5-norbornene-2-methylene)-cyanurate; and the like. Particularly useful is triallyl isocyanurate.

The composition can also contain one or more additives such as those known to be useful in fluoropolymer compositions, for example, pigments, fillers, pore-forming agents and liquid organic solvents. An example of a useful type of solvent is the one described in Proskow in U.S. Pat. No. 3,740,369. Others include acetone, methyl ethyl ketone, ethyl acetate, amyl acetate, tetrahydrofuran and the like. By adding a suitable solvent, one can prepare a liquid composition useful in the preparation of adhesive layers, coatings, films and the like.

In preparing the present fluoropolymer composition, one can mix the copolymer with the other ingredients by means of any mixing apparatus known to be useful for preparing rubber or plastic compositions; for example, one can use a roller-type rubber mill or Banbury mixer equipped to operate at a temperature below the decomposition temperature of the organic peroxide.

The composition can be cured by subjecting it to condititons which result in the decomposition of the organic peroxide, for example, by heating the composition at a temperature which causes the peroxide to decompose. The initial curing is preferably carried out by heating the composition for about 1–60 minutes at about 149°–204° C.; conventional rubber- and plastic-curing presses, molds, extruders, and the like provided with suitable heating and curing means can be used. Also, if one wants a product having maximum heat resistance and dimensional stability, it is preferred to carry out a post-curing operation wherein the article is heated in an oven or the like for an additional period of about 1–48 hours at about 180°–300° C. One skilled in the art will realize that the best curing time and temperature for a particular application will depend on such factors as the nature and proportion of ingredients and the properties needed in the final product.

The fluoroelastomer compositions of the present invention give vulcanizates with improved resistance to certain types of environmental attack, e.g., improved resistance to attack by water and acid, as compared with compositions otherwise the same but containing metal oxide or hydroxide instead of oxirane.

The following examples demonstrate various embodiments of the present invention and their unexpected superiority over conventional compositions containing metal hydroxide. All parts and percentages are by weight unless otherwise specified.

EXAMPLES

The fluoroelastomers and other compounding ingredients shown in the following Tables were thoroughly mixed on a two-roll mill which was cooled with cold tap water (10°–21° C.). Test pieces were cured in a platen press for 10 minutes at 177° C. and then in an air oven for 24 hours at 232° C. Room temperature tensile properties were determined according to ASTM Method D 412-7, and resistance to various hot fluids was determined by ASTM Method D471-75. The superiority of the compositions of this invention which contain oxiranes instead of calcium hydroxide is shown by their much smaller volume increase after exposure to hot water or acids. Table I represents compositions in which the fluoroelastomer is a copolymer derived from 37% vinylidene fluoride, 36% hexafluoropropylene, 26% tetrafluoroethylene and 1% bromotrifluoroethylene. Table II represents compositions in which the fluoroelastomer is a copolymer derived from 37% vinylidene fluoride, 30% hexafluoropropylene, 32% tetrafluoroethylene and 1% bromotrifluoroethylene. In all cases, the peroxide was 2,5-dimethyl-2,5-di(t-butylperoxy)hexane, commercially available under the name "Lupersol" 101 from Wallace-Tiernan Division of Pennwalt Corporation of Belleville, N.J.

TABLE I

| | Example No. | | |
|---|---|---|---|
| | 1 | 2 | 3 |
| INGREDIENTS (parts) | | | |
| Fluoroelastomer | 100 | 100 | 100 |
| Carbon Black (MT) | 30 | 30 | 30 |
| Oxirane A[1] | 3 | | |
| Oxirane B[2] | | 3 | |
| Calcium hydroxide | | | 3 |
| Triallylisocyanurate | 2 | 2 | 2 |
| Peroxide | 1 | 1 | 1 |
| TENSILE PROPERTIES | | | |
| Stress at 100% elong. (MPa) | 7.1 | 7.9 | 9.7 |
| Stress at break (MPa) | 17.0 | 15.9 | 19.1 |
| Elong. at break (%) | 175 | 160 | 155 |
| Hardness - Shore A | 78 | 85 | 72 |
| VOLUME SWELL (%) | | | |
| 2 wk in 100° C. water | 3.2 | 3.7 | 12.8 |
| 4 wk in 100° C. water | 2.8 | — | 15.1 |
| 1 wk in 70° C. HCl (37%) | 0.7 | — | 9.7 |
| 2 wk in 70° C. HCl (37%) | 1.8 | 2.1 | 16.4 |
| 1 wk in 70° C. NO$_3$ (70%) | 4.8 | — | 10.5 |

[1]Condensation product of bisphenol A and epichlorohydrin, sold as "Epon 828" by Shell Chemical Company.
[2]Condensation product of novolak resin and epichlorohydrin, sold as "DEN 438" by Dow Chemical Company.

TABLE II

| | Example No. | | | | |
|---|---|---|---|---|---|
| | 4 | 5 | 6 | 7 | 8 |
| INGREDIENTS (parts) | | | | | |
| Fluoroelastomer | 100 | 100 | 100 | 100 | 100 |
| Carbon black (MT) | 30 | 30 | 30 | 30 | 30 |
| Oxirane A[1] | 2 | 3 | 6 | | |
| Oxirane C[2] | | | | 3 | |
| Calcium hydroxide | | | | | 3 |
| Triallylisocyanurate | 2 | 2 | 2 | 2 | 2 |
| Peroxide | 1.5 | 1.5 | 1.5 | 1.5 | 1.5 |
| TENSILE PROPERTIES | | | | | |
| Stress at 100% elong. (MPa) | 6.2 | 6.7 | 8.1 | 6.8 | 8.5 |
| Stress at break (MPa) | 15.8 | 15.3 | 13.5 | 16.9 | 18.5 |
| Elong. at break (%) | 200 | 195 | 180 | 195 | 155 |
| Hardness - Shore A | 76 | 80 | 87 | 80 | 85 |
| VOLUME SWELL (%) | | | | | |
| 2 wk in 100° C. water | 3.4 | 3.1 | 3.0 | 4.0 | 10.2 |
| 1 wk in 70° C. HCl (37%) | 13.8 | 4.2 | 2.8 | 5.8 | 13.5 |
| 1 wk in 70° C. HCO$_3$ (70%) | 5.9 | 3.5 | 1.1 | — | 11.8 |

[1]Condensation product of bisphenol A and epichlorohydrin, sold as "Epon 828" by Shell Chemical Company.
[2]Condensation product of resorcinol and epichlorohydrin, sold as "ERE 1359" by Ciba-Geigy Corporation.

Industrial Applicability

The fluoroelastomer compositions of the present invention are useful in the manufacture of finished parts such as films, gaskets, O-rings, coated fabrics, wire insulation, hoses and protective coatings. The improved resistance to environmental attack by water and acids make these compositions particularly well suited for applications where such conditions are likely to be encountered.

Best Mode

Although the best mode of the present invention, i.e., the single most preferred composition of the present invention, will depend upon the particular desired end use and the specific requisite combination of properties for that use, the composition of the present invention which is likely to offer the best overall combination of properties for the widest variety of possible end uses is that described in detail in Example 5.

I claim:
1. A peroxide curable fluoroelastomer composition comprising:
(A) a fluoroelastomer selected from the group consisting of:
(1) a copolymer whose interpolymerized units consist essentially of

(a) up to 3 mole %, based on the total moles of components (a) and (b), of units derived from a compound selected from the group: bromotrifluoroethylene and 4-bromo-3,3,4,4-tetrafluorobutene-1, with the proviso that enough of such units are present to provide at least 0.05 weight % bromine in the copolymer, and (b) enough units derived from component (b-1) (b-2) or (b-3) as follows to make up the remainder of the copolymer;

b-1. tetrafluoroethylene and a perfluoroalkyl perfluorovinyl ether wherein the alkyl group contains 1-5 carbon atoms, b-2. about 45-65 mole % of tetrafluoroethylene, about 20-55 mole % of a $C_2$-$C_4$ olefinic hydrocarbon and from 0 to about 30 mole % vinylidene fluoride, or b-3. vinylidene fluoride, at least one fluorine-containing olefin copolymerizable therewith, and optionally said perfluoroalkyl perfluorovinyl ether, said olefin being a compound which contains 2-7 carbon atoms, contains no bromine atom, and contains at least as many fluorine atoms as carbon atoms, and (2) a blend of 10-95 weight percent of the copolymer (1) with 5-95 weight percent of a non-crosslinked fluoroelastomer comprising a copolymer of vinylidene fluoride and at least one other fluoroolefin, (B) an organic peroxide curing agent, (C) an unsaturated co-agent, and (D) 0.5-10 parts per 100 parts of the fluoroelastomer composition of an oxirane.

2. A peroxide curable fluoroelastomer composition of claim 1 wherein the oxirane has a molecular weight of about 400-10,000.

3. A peroxide curable fluoroelastomer composition of claim 1 wherein the oxirane is present in an amount of 1-5 parts per 100 parts of the fluoroelastomer composition.

4. A peroxide curable fluoroelastomer composition of claim 1 wherein the oxirane is selected from the group consisting of (a) the condensation product of bisphenol A and epichlorohydrin, (b) the condensation product of novolak resin and epichlorohydrin, and (c) the condensation product of resorcinol and epichlorohydrin.

5. Cured articles made from the composition of claim 1.

* * * * *